(12) United States Patent
Salters

(10) Patent No.: US 8,385,707 B2
(45) Date of Patent: Feb. 26, 2013

(54) LAYERED LIGHT GUIDE FOR PRODUCING AMBIENT LIGHTING

(75) Inventor: Bart Andre Salters, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 1286 days.

(21) Appl. No.: 12/097,634

(22) PCT Filed: Dec. 13, 2006

(86) PCT No.: PCT/IB2006/054827
§ 371 (c)(1),
(2), (4) Date: Jun. 16, 2008

(87) PCT Pub. No.: WO2007/072340
PCT Pub. Date: Jun. 28, 2007

(65) Prior Publication Data
US 2009/0046477 A1    Feb. 19, 2009

Related U.S. Application Data

(60) Provisional application No. 60/752,078, filed on Dec. 20, 2005, provisional application No. 60/821,277, filed on Aug. 3, 2006.

(51) Int. Cl.
*G02B 6/00* (2006.01)
(52) U.S. Cl. ....................................................... 385/133
(58) Field of Classification Search ........................ None
See application file for complete search history.

(56) References Cited

U.S. PATENT DOCUMENTS

| | | | |
|---|---|---|---|
| 2,480,178 A | | 8/1949 | Zinberg |
| 5,359,503 A | * | 10/1994 | Myodo et al. ................. 362/127 |
| 6,079,841 A | | 6/2000 | Suzuki |
| 6,611,297 B1 | | 8/2003 | Akashi et al. |
| 6,921,452 B2 | * | 7/2005 | Veligdan ....................... 156/253 |
| 7,972,050 B2 | * | 7/2011 | Overes et al. ................. 362/555 |
| 8,233,033 B2 | * | 7/2012 | Aarts et al. ...................... 348/51 |
| 2002/0108693 A1 | * | 8/2002 | Veligdan .......................... 156/99 |
| 2005/0024744 A1 | | 2/2005 | Falicoff et al. |

FOREIGN PATENT DOCUMENTS

WO    2004006570    1/2004
WO    2005069640 A    7/2005

* cited by examiner

*Primary Examiner* — Sung Pak
(74) *Attorney, Agent, or Firm* — Shimokaji & Assoc., P.C.

(57) ABSTRACT

A device (100, 200, 300, 400, 500) including an ambient image light source (110, 210, 310) and a stacked plurality of ambient imaging light guides (120, 220, 320) The ambient image light source (110, 210, 310) is arranged to couple light into the stacked light guides (120, 220, 320). The stacked light guides (120, 220, 320) are arranged to couple out corresponding ambient image light portions onto a reflective surface (130, 230). The stacked light guides (120, 220, 320) may be arranged to provide the ambient image light portions extending outward from the device (100, 200, 300, 400, 500) such that a first one of the ambient image light portions extends substantially outward from a second one of the ambient image light portions. The second one of the ambient image light portions may be projected closer to the device (100, 200, 300, 400, 500) and may be projected to reflect brighter than the first one of the ambient image light portions.

15 Claims, 3 Drawing Sheets

LAYERED LIGHT GUIDE FOR PRODUCING AMBIENT LIGHTING

The present system relates to a device for producing an ambient lighting effect utilizing a layered light guide arranged to guide light outward from the device onto a display surface.

Koninklijke Philips Electronics N.V. (Philips™) and other companies have disclosed means for changing ambient or peripheral lighting to enhance video content for typical home or business applications. Ambient lighting added to a video display or television has been shown to reduce viewer fatigue and improve realism and depth of experience. Currently, Philips has a line of televisions, including flat panel televisions with ambient lighting, where a frame around the television includes ambient light sources that project ambient light on a back wall that supports or is near the television. Further, light sources separate from the television may also be controlled to produce ambient light that may be similarly controlled.

PCT Patent Application WO 2004/006570 incorporated herein by reference as if set out in entirety, discloses a system and device for controlling ambient lighting effects based on color characteristics of displayed content, such as hue, saturation, brightness, colors, speed of scene changes, recognized characters, detected mood, etc. In operation, the system analyzes received content and may utilize the distribution of the content, such as average color, over the entire display or utilize the portions of the displayed content that are positioned near a border of the display to control ambient lighting elements. The ambient light feature generally uses the video content of the display itself to generate the ambient lighting effects, for example on a per frame or group of frames basis together with temporal averaging to smooth out temporal transitions of the ambient lighting elements. In other embodiments, the ambient lighting effects may be produced by ambient light scripts that correspond and often are synchronized to rendered content, such as rendered audio and/or visual content.

Typical ambient lighting solutions are limited in the gamut of colors that may be produced and/or the gamut of colors that may be reproduced simultaneously. Further, the intensity of the ambient lighting tends to diminish as a distance between an object reflecting the ambient light (e.g., a back wall) and the ambient light source increases.

It is an object of the present system to overcome disadvantages and/or make improvements in the prior art.

A device such as one having a display surface, such as a television, whiteboard, or any other device where it is desired to provide a surrounding ambient light, in accordance with the present system includes an ambient image light source and a stacked plurality of ambient imaging light guides. The ambient image light source is arranged to couple light into the ambient imaging light guides. The ambient imaging light guides are arranged to couple out corresponding ambient image light portions onto a reflective surface.

The device may include a processor operationally coupled to the ambient image light source. The processor may analyze content and control the ambient image light source to provide the light to the ambient image light guides in response to the analyzed content. In this way, the ambient image light portions may be provided corresponding and synchronized to content that is provided by the device. In another embodiment the processor may analyze a received ambient effect script and control the ambient image light source to provide the light in response to the analyzed ambient effect script typically in synchronization to rendering of content.

The ambient imaging light guides may be joined together by an optically isolating joining compound that optically isolates one of the ambient imaging light guides from another one of the ambient imaging light guides. The ambient imaging light guides may have formed ends at a portion that is distal from the ambient image light source. In operation, light is coupled into the ambient image light guides from the light source. The coupled light travels to the formed ends of the ambient imaging light guides which refract the ambient image light portions onto a surface positioned in proximity to a backside of the device. The surface in turn reflects the light outward, for example, so that it is viewable by a user.

The ambient imaging light guides may be arranged to provide the ambient image light portions extending outward from the device such that a first one of the ambient image light portions extends substantially outward from a second one of the ambient image light portions. The second one of the ambient image light portions may be projected closer to the device and may be projected at a brighter illumination than the first one of the ambient image light portions. The ambient imaging light guides may be one of a plurality of stacked ambient imaging light guides that together provide ambient image light portions that substantially surround a portion of the device. In one embodiment, the ambient imaging light guides may be formed as two or more ambient image light guides, such as three ambient image light guides stacked to produce a series of three ambient image light portions that successively extend away from a side of the device.

It should be expressly understood that the drawings are included for illustrative purposes and do not represent the scope of the present system. The invention is best understood in conjunction with the accompanying drawings in which.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present system.

In the accompanying description, like reference numbers in different drawings may designate similar elements.

Figure 1:
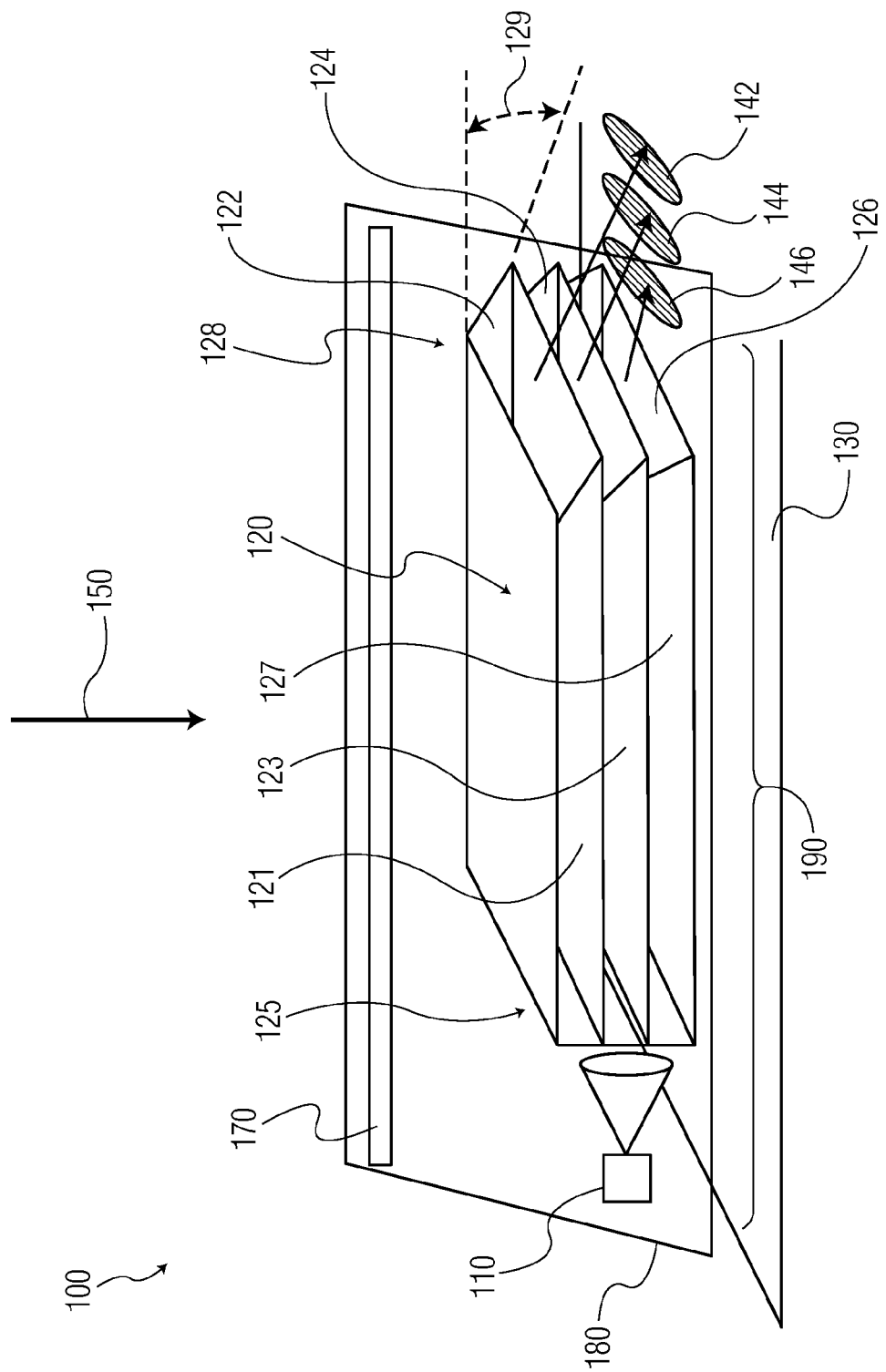
FIG. 1 shows a side view of a device according to an illustrative embodiment of the present system.

FIG. 1 shows a portion of a device 100, such as one having a display surface, such as a television, whiteboard, or any other device 100 where it is desired to provide a surrounding ambient light. In an embodiment where the device 100 is a television display device, the device is configured for rendering audio/visual content and producing a corresponding ambient lighting effect in accordance with an embodiment of the present system. The device 100 includes a display surface 170, such as a liquid crystal display (LCD) surface, plasma display surface, cathode ray tube (CRT) display surface or other suitable surface for rendering a visual portion of content, such as audio/visual content, to be viewed from a viewing direction 150. The device 100 is shown positioned in front of a reflective surface 130, such as a wall, a ceiling, a floor, a canvas, a dedicated projection surface, and/or any other system/method of reflecting an ambient lighting effect that may be provided in accordance with the present system. The device 100 includes an ambient lighting source 110 and a stacked light guide 120 in accordance with the present system, collectively referred to herein as a light engine 190. As shown, the light engine 190 is illustratively shown contained within an enclosure 180 of the device 100. The enclosure 180 may be a cabinet as is utilized for containing other elements of the device 100, such as other components that may be utilized for receiving content, processing the content, rendering the content, determining an ambient lighting effect etc.

The light engine 190 operates in accordance with the present system to render an ambient lighting effect. In operation, the ambient lighting source 110 is controlled to produce a desired ambient light output. The ambient lighting source 110 may include a light valve, such as one or more LCD panels, that are utilized to modulate or reflect lighting components of the desired ambient lighting effect. The ambient lighting source may also include high-brightness LEDs, white LEDs, RGB LEDs, red LEDs, blue LEDs, green LEDs, organic LEDs, and other lighting elements that are enabled to produce light that may be coupled into the stacked stacked light guide 120. Packaged LEDs, non-packaged LEDs, surface mount LEDs, chip on board LEDs, and LEDs of other configurations may also be suitably utilized. In one embodiment, the ambient lighting source 110 may be in the form of a projection device including a beamer based on liquid crystal display (LCD) technology, light emitting display (LED) technology, laser technology, etc. In another embodiment, the ambient lighting source 110 may be formed from a scanning laser-based pico-beamer which may enable highly detailed images with sufficient brightness, sharpness, and depth of focus to be provided to the stacked stacked light guide 120.

The stacked light guide 120 may be comprised of a plurality of light guides, such as light guides 121, 123, 127 that are positioned in close proximity to each other and that are arranged to provide a series of ambient image portions that successively project outward. The term "stacked light guide" as utilized herein is intended to encompass a plurality of light guides that are arranged in accordance with the present system and as further described herein.

Illustratively, the stacked light guide 120 may operate on the principle that a material, such as a piece of glass, having straight (smooth) surfaces guides light without loss, due to total internal reflection. In one embodiment, the stacked light guide 120 may be formed from a polymethyl methacrylate material (PMMA) and be formed as a plurality of light guide plates that are stacked one on top of the other. In an alternate embodiment, the stacked light guide 120 may be formed from glass or any other suitable material that exhibits one or more of the properties described herein. The stacked light guide 120 has light from the ambient lighting source 110 coupled in on an end 125 that is in proximity to the ambient lighting source 110. In one embodiment, the ambient lighting effect provided to the stacked light guide 120 may be collimated by the ambient lighting source 110 prior to being coupled into the stacked light guide 120.

Due to the transmissive properties of the stacked light guide 120, the light is transferred from the end 125 that is proximate to the ambient lighting source 110, to an end 128 of the stacked light guide 120 that is distal to the ambient lighting source 110. The end 128 has slanted portions 122, 124, 126 that couple the light out of the stacked light guide 120 towards the reflective surface 130 to form corresponding ambient image portions 142, 144, 146. The term ambient image portion is intended herein to encompass an ambient lighting effect that may be produced including single or multiple light components, and/or composite picture elements. As may be readily apparent, many factors affect the display characteristics of the ambient image portions 142, 144, 146 as well as a composite ambient lighting effect that is produced. For example, varying an angle 129 of the slanted portions 122, 124, 126 will affect the direction that the light is coupled (e.g., refracted) out of the stacked light guide 120. For example, angles 129 for the slanted portions 122, 124, 126 may vary in a range of just greater than zero degrees to an angle of approximately 45 degrees depending on e.g., the refractive index of the material selected for the stacked light guide 120. With a zero degree angle, light would not be refracted at all towards the reflective surface 130, and in effect, would travel further on in a direction substantially parallel to the reflective surface 130. An angle larger than 45 degrees, approximately (again depending on e.g., the refractive index of the material), might not refract the light either, but reflect it in a different way as would be readily appreciated by a person of ordinary skill in the art. The distance of the stacked light guide 120 from the reflective surface 130 and an angle of the stacked light guide 120 with respect to the reflective surface 130 will affect both the dispersion and brightness of the composite ambient lighting effect.

Accordingly, while the ambient image portions 142, 144, 146 are shown as separate non-overlapping light portions, this is shown merely to illustrate the relationship of the ambient image portions 142, 144, 146 to the slanted portions 122, 124, 126 of the stacked light guide 120. As may be readily appreciated, the ambient image portions 142, 144, 146 may tend to disperse and produce overlapping ambient image portions 142, 144, 146. For example, the ambient image portion 146 may tend to disperse towards the ambient image portion 144. Further, the ambient image portion 144 may tend to disperse towards the ambient image portion 142. In accordance with an embodiment of the present system, the ambient image portions 142, 144, 146 may produce a composite ambient lighting effect that does not have any non-overlapping areas between the ambient image portions 142, 144, 146. In this way, the ambient lighting effect may be a continuous effect from an inside edge of the ambient image portion 146 (e.g., an edge closest to the device 100) to an outside edge of the ambient image portion 142.

In accordance with an embodiment of the present system, each of the plurality of light guides may be separated from each other of the plurality of light guides by an isolating medium. Optical isolation of the light guides helps to ensure that light coupled into a particular one of the light guides does not get coupled into another one of the light guides through adjoining surfaces of the light guides. For example, one or more of the plurality of light guides may be separated from another one or more of the plurality light guides by an air gap. Since air has a smaller refractive index than the material that the light guides are formed from, such as PMMA plates, the air gap assists in the decoupling of the light guides. In this way, light from one of the light guides is not mixed within the light guide with light from another one of the light guides. In another embodiment, the light guides may be joined together utilizing an optically isolating paste, such as an opaque or reflective paste. In this way, surfaces between light guides 121, 123, and 127 are optically isolating, such as reflective. Other systems for optically isolating the light guides would readily occur to a person of ordinary skill in the art and may be suitably utilized in accordance with the present system.

To facilitate production of the ambient lighting effect, the ambient lighting source 110 and the stacked light guide 120 may be positioned towards a back side of the device 100 such that ambient displayed image portions 142, 144, 146 are displayed on the reflective surface 130 that is positioned in proximity to the backside of the device 100. In this or other embodiments, the end 128 of the stacked light guide 120 may be positioned along a bezel of the device 100 and/or integrated into the bezel to facilitate production of the ambient lighting effect.

Figure 2:
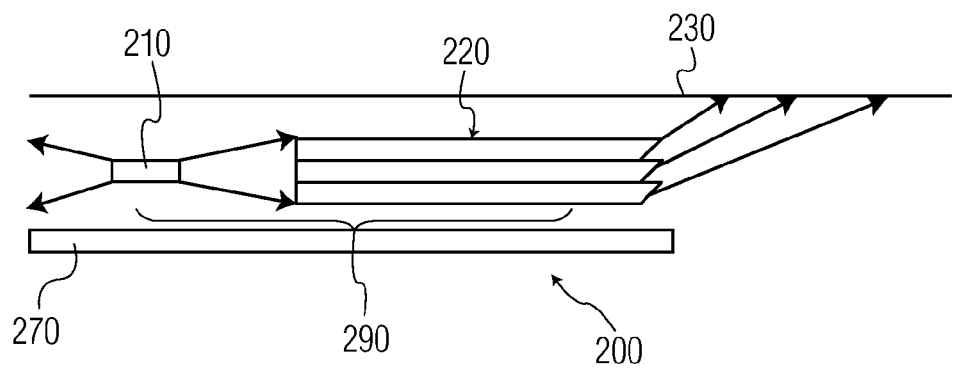
FIG. 2 shows an overhead view of a device in accordance with an embodiment of the present system.

FIG. 2 shows an overhead view of a portion of a device 200 in accordance with an embodiment of the present system. An enclosure that may be typically utilized for enclosing components of the device 200 is not shown merely to simplify the following discussion. To facilitate production of the ambient lighting effect, an ambient lighting source 210 and a stacked light guide 220, collectively a light engine 290, may be positioned towards a back side of the device 200 such that ambient displayed image portions are displayed on a reflective surface 230 that is positioned in proximity to the backside of the device 200. While the device 200 is illustratively shown having a single ambient lighting source 210, the ambient lighting source 210 may be configured to provide the same or different image portions to each of the plurality of stacked light guides (plates) of the stacked light guide 220. In a further embodiment, the ambient lighting source 210 may be arranged to couple light into the stacked light guide 220 and one or more further light guides (not shown) to help produce an ambient lighting effect that is dispersed along a perimeter of the device 200. For example, a further stacked light guide may be positioned to a left side, with respect to the perspective provided in FIG. 2, of the ambient lighting source 210 to produce an ambient lighting effect left of the device 200. In further embodiments, the device 200 may include a plurality of ambient lighting sources and light guides arranged as separate light engines to produce an ambient lighting effect that surrounds one or more sides of the device.

Figure 3:
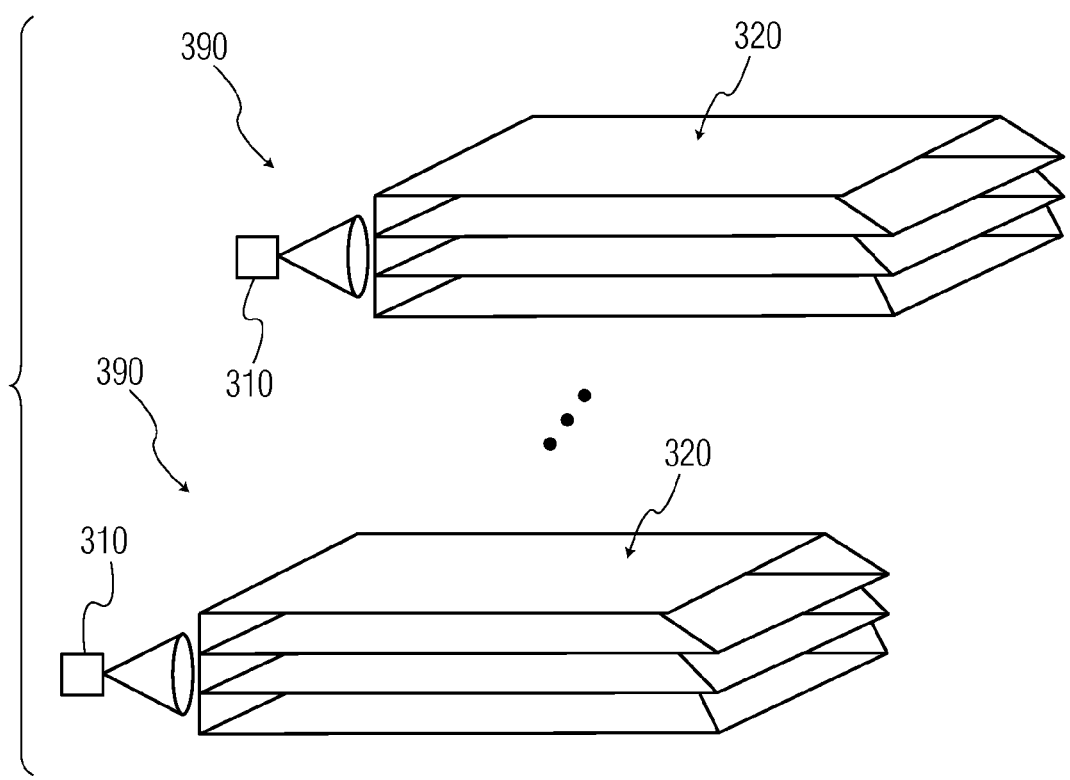
FIG. 3 shows a view of a plurality of light engines in accordance with an embodiment of the present system.

FIG. 3 shows a view of a plurality of light engines 390 in accordance with an embodiment of the present system. Each of the plurality of light engines 390 is illustratively shown made up of a plurality of stacked light guides, such as the stacked light guide 120, including light guides 121, 123, and 127 as depicted in FIG. 1. In one embodiment, each of the plurality of light engines may be separated from each other of the plurality of light engines by an isolating medium. Optical isolation of the light engines, like the optical isolation of the individual light guides as discussed previously, helps to ensure that light coupled into a particular one of the stacked light guides does not get coupled into another one of the stacked light guides through adjoining surfaces of the stacked light guides. For example, the stacked light guides of each light engine may be separated from each other stacked light guide by an air gap. Since air has a smaller refractive index than the material that the stacked light guides are formed from, such as PMMA plates, the air gap assists in the decoupling of the stacked light guides. In another embodiment, the stacked light guides may be joined together utilizing an optically isolating paste, such as an opaque or reflective paste. Other systems for optically isolating the stacked light guides would readily occur to a person of ordinary skill in the art and may be suitably utilized in accordance with the present system.

Figure 4:
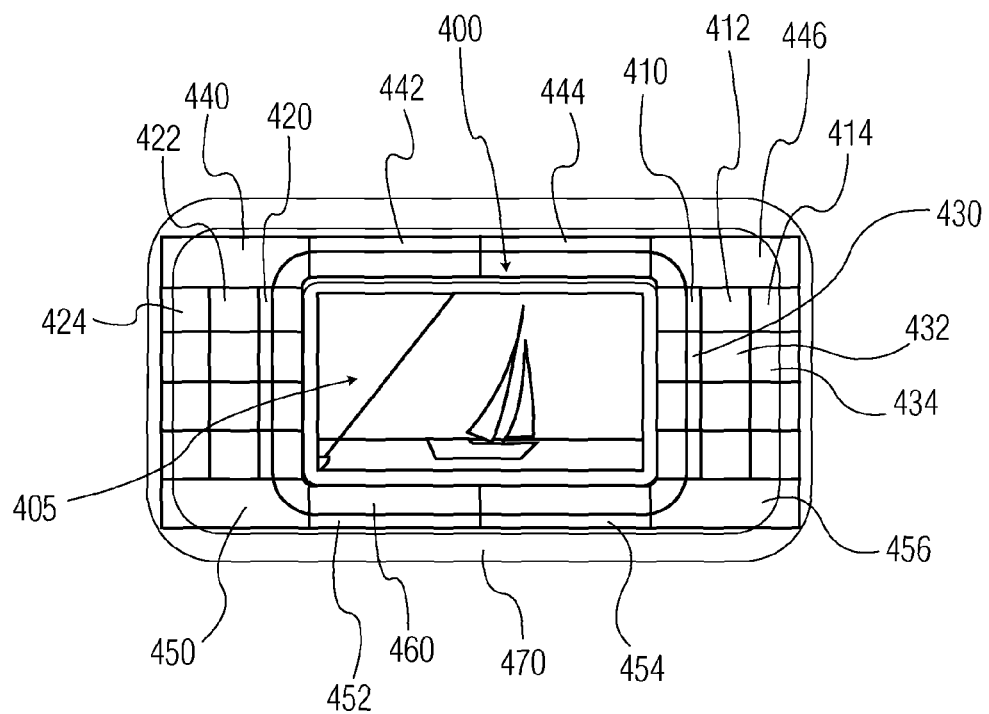
FIG. 4 shows a front view of a device in accordance with an embodiment of the present system.

FIG. 4 shows a front view of a device 400 in accordance with an embodiment of the present system. As shown, the device 400 is operable to produce one or more ambient image portions on a right and left side of the device 400, such as ambient image portions 410, 412, 414 and ambient image portions 420, 422, 424. In accordance with the present system, the ambient image portions 410, 412, 414 and ambient image portions 420, 422, 424 may be produced by one or more ambient lighting sources and light guides of the device 400, such as the light engines shown in FIG. 3. The ambient image portions together provide a pixilated ambient lighting effect that may be differentiated in both of a vertical direction (e.g., between the ambient image portions 410, 412, 414 and respective ambient image portions 430, 432, 434) and a horizontal direction (e.g., between the ambient image portions 410, 412, 414). By the term differentiated, what is intended is that an ambient lighting effect may vary from one ambient image portion to a next ambient image portion, if it is desired.

The device 400 in accordance with an embodiment of the present system may also produce one or more ambient light portions that are reflected above and/or below the device 400, such as ambient light portions 440, 442, 444, 446, 450, 452, 454, and 456. The ambient light portions 440, 442, 444, 446, 450, 452, 454, and 456 may be produced using multiple (single) light guides, one or more light engines, such as the light engine 190, or multiple individual light sources, such as LED's, light tubes, etc. or other suitable systems for producing the depicted ambient lighting effects. As should be readily apparent, more or less pixilated regions may be produced in accordance with the present system as desired. So as should be clear, in accordance with the present invention, light engines such as light engine 190, light engine 390 and other light sources even independent of light guides may be combined together to produce a desired composite ambient lighting effect. In one embodiment, a centrally positioned light source may provide an ambient lighting effect around a device by coupling light into the plurality of the stacked light guides 390. In any case, each of resultant ambient image portions may be provided having particular ambient lighting characteristics as desired. For example, it may be desirable that ambient image portions positioned closer to the device 400 (e.g., portions in range 460), such as ambient image portions 410, 420, 430, 440, 442, 444, 446, 450, 452, 454, 456, appear brighter than ambient image portions positioned further from the device 400 (e.g., portions in range 470), such as ambient image portions 414, 424, 434. This difference in brightness of the reflected ambient image portions may be accomplished by providing the ambient image portions in different light intensities. For example, ambient image portions that are reflected close to the device 400 may be provided having a light intensity of between 200-500 lux, such as 350 lux, while ambient image portions that are reflected further from the device 400 may be provided having a light intensity of between 20-50 lux, such as 35 lux. In this way, the brightness of the reflected ambient image portions will correspondingly vary. In one embodiment, the light intensity of one or more of the ambient image portions may be adjusted to be close to an intensity of rendered content from a device in which the stacked light guides are provided. For example, the device 400 may be provided with a display surface 405 for rendering content that may have certain display characteristics, such as an intensity of the rendered content. By matching an intensity of the rendered content to an intensity of the ambient image portions, an impression may be provided that the rendered content extends beyond an edge of the device 400. Naturally, other lighting characteristics may be adjusted in accordance with the present system including varying the intensity of the ambient image portions in different proportions, making the brightness of the reflected ambient image portions the same and/or making reflected ambient image portions that are remote from the device brighter than reflected ambient image portions that are closer to the device.

As should be clear from the illustrative embodiments described herein, the present system provides an opportunity to make available a wider color gamut that previously realized in prior systems. Further, the present system provides an elegant, potentially inexpensive way to build a "pixilated" ambient lighting system that provides more apparent pixels of ambient lighting than heretofore realized by prior systems. Other benefits and modifications would readily occur to a person of ordinary skill in the art and may be suitably applied in accordance with the present system.

Figure 5:
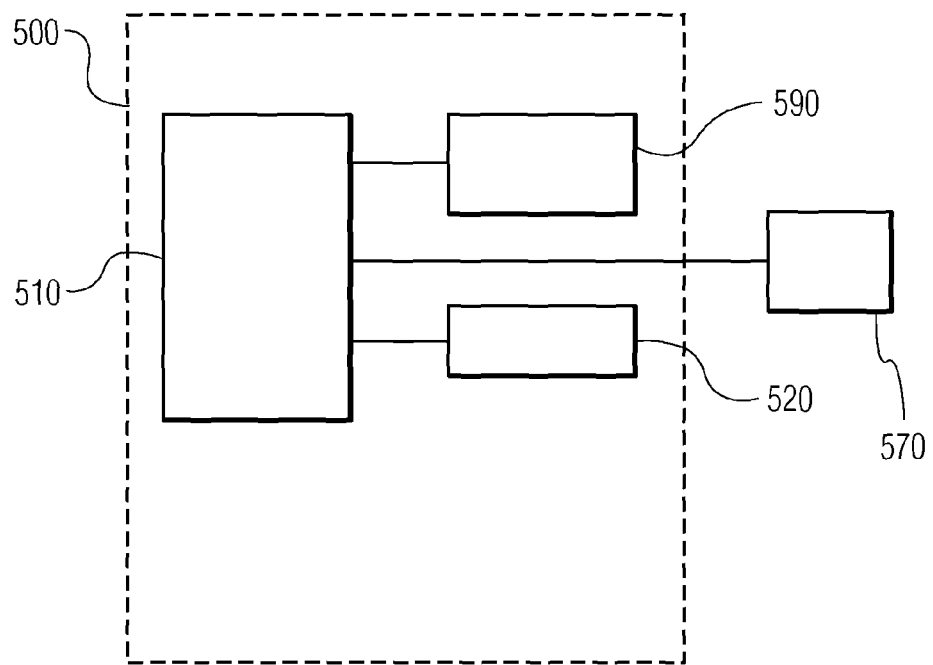
FIG. 5 shows a schematic diagram of a device, such as a television, in accordance with an embodiment of the present system.

FIG. 5 shows a device 500, such as a television, in accordance with an embodiment of the present system. The device has a processor 510 operationally coupled to a memory 520, one or more light engines 590 and a user input device 570 for operation of the display device 500. The memory 520 may be any type of device for storing application data as well as other data, such as audio/visual data and ambient lighting data, such as ambient light scripts. The application data and other data are received by the processor 510 for configuring the processor 510 to perform operation acts in accordance with the present system. The operation acts include controlling the device 500 to display content and controlling the light engine 590 to display ambient image portions in accordance with the present system that may be related to image content and/or may be unrelated to image content. The user input device 570 may include a keyboard, mouse, remote control and/or other device, including a touch sensitive display. The user input device 570 may be stand alone or be a part of a system like a personal computer, personal digital assistant, display device such as a television, whiteboard, etc. and operate for communicating with the processor 510 via any type of link, such as a wired or wireless link.

The methods of the present system are particularly suited to be carried out by a computer software program, such computer software program preferably containing modules corresponding to individual and/or composite steps or acts. Such software may of course be embodied in a computer-readable medium, such as an integrated chip, a peripheral device or memory, such as the memory 520 or other memory coupled to the processor 510.

The memory 520 may also store an ambient effect script for producing the ambient image portions in synchronization with rendered content, such as audio/visual content or rendered independent of content. The memory 520 configures processor 510 to implement the methods, operational acts, and functions disclosed herein. The memories may be distributed or local and the processor 510, where additional processors may be provided, may also be distributed, as for example based within the light engines 590, or may be singular.

The processor 510 is capable of providing control signals and/or performing operations in response to input signals from the I/O device 570 and executing instruction stored in the memory 520. The processor 510 may be an application-specific or general-use integrated circuit(s). Further, the processor 510 may be a dedicated processor for performing in accordance with the present system or may be a general-purpose processor wherein only one of many functions operates for performing in accordance with the present system. The processor 510 may operate utilizing a program portion, multiple program segments, or may be a hardware device utilizing a dedicated or multi-purpose integrated circuit.

Of course, it is to be appreciated that any one of the above embodiments or processes may be combined with one or with one or more other embodiments or processes to provide even further improvements in accordance with the present system.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. For example, while a reflective surface is discussed herein for reflecting the ambient image portion, as should be clear from the discussion above, the term surface is intended to broadly cover any system, means, etc. of reflecting the ambient image portions. In addition, more or less light guides may be utilized as the stacked light guides than is depicted in the figures. For example, as few as two light guides may be stacked in accordance with the present system. In other embodiment, as many light guides as may be desired may be stacked to provide corresponding ambient image light portions extending outward.

The device that houses the stacked light guides may be a display device such as a television, whiteboard, etc., or may simply be any device in which it is desired to provide ambient image portions that surround at least some portion of the device or some portion of a device that in turn houses the device. For example, the device housing the stacked light guide may be simply an ambient light module that is provided separate from or is in turn enclosed within another device. In this way, a centrally positioned light source may provide an ambient lighting effect around the device within a potentially limited and flat space between the device and the reflected surface. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A light engine configured to produce ambient lighting effects in cooperation with a display device having a display surface for displaying an image, said light engine comprising:
 a light source for controllably producing a light output supplemental to said image; and
 a stacked plurality of light guides arranged to couple at least part of said light output into said light guides and to couple a plurality of portions of the light output from the light source out of respective ones of said light guides to at least one reflective surface positioned to direct said light portions from a location outward from at least one side of the display surface and toward a viewer of said displayed image.

2. The light engine of claim 1 comprising a processor operationally coupled to the light source and configured to:
   analyze video content representative of the displayed image; and
   control the light source to provide the light output in response to the analyzed video content.

3. The light engine of claim 1 comprising a processor operationally coupled to the light engine and configured to:
   analyze a received ambient effect script; and
   control the light source to provide the light in response to the analyzed ambient effect script.

4. The light engine of claim 1 where at least first and second ones of the stacked plurality of light guides are joined together by an optically isolating joining compound that optically isolates the first and second ones of said light guides from each other.

5. The light engine of claim 1 where the stacked plurality of light guides have, at respective positions that are distal from the light source, slanted ends that are angled to refract the light portions toward said at least one reflective surface.

6. The light engine of claim 5 where the stacked plurality of light guides are arranged to direct at least first and second ones of the refracted light portions toward different respective positions on said at least one reflective surface.

7. The light engine of claim 6 where the second one of the refracted light portions is reflected closer to the at least one side of the display surface than the first one of the refracted light portions and the light engine is configured to provide different brightnesses for the first and second ones of the refracted light portions.

8. An ambient lighting system configured to produce ambient lighting effects in cooperation with a display device having a display surface for displaying an image, said system including a light engine comprising:
   at least one light source for controllably producing a light output supplemental to said image; and
   at least first and second stacked pluralities of light guides arranged to couple at least part of said light output into said light guides and to couple a plurality of portions of the light output from the at least one light source out of respective ones of said light guides to reflective surfaces positioned to direct said light portions from locations disposed around sides of the display surface and toward a viewer of said displayed image.

9. The ambient lighting system of claim 8 comprising a plurality of said light sources, each disposed for controllably producing said light output for coupling into a respective one of the at least first and second stacked pluralities of light guides.

10. The light engine of claim 1 where the light source comprises a light valve for controllably producing light portions having different lighting characteristics for coupling to different ones of said stacked plurality of light guides.

11. A television for producing an image on a display surface and including a light engine configured to produce ambient lighting effects in cooperation with the production of said image, said light engine comprising:
   a light source for controllably producing a light output supplemental to said image; and
   a stacked plurality of light guides arranged to couple at least part of said light output into the light guides and to couple a plurality of portions of the light output from the light source out of respective ones of said light guides to at least one reflective surface positioned to direct said light portions from a location to outward from at least one side of the display surface and toward a viewer of said displayed image.

12. The television of claim 11 where the stacked plurality of light guides are arranged to refract first and second ones of the light portions toward different respective positions on the at least one reflective surface.

13. The television of claim 12 where the second one of the refracted light portions is reflected closer to the at least one side of the display surface than the first one of the refracted light portions and the light engine is configured to provide different brightnesses for the first and second ones of the refracted light portions.

14. The television of claim 11 comprising a number of the stacked pluralities of light guides that together provide light portions that are coupled out to a plurality of the reflective surfaces positioned to substantially surround the display surface with reflected light.

15. The television of claim 14 comprising a plurality of light sources for controllably producing respective light outputs supplemental to said image, each of said light sources coupling light portions into at least one of the number of stacked pluralities of light guides.

* * * * *